United States Patent [19]

Vail

[11] 4,101,787
[45] Jul. 18, 1978

[54] ELECTRICAL POWER SUPPLY

[75] Inventor: Ande R. Vail, Boise, Id.

[73] Assignees: Meb, Inc.; Au-Tom-A-Ton Research Company, both of Boise, Id.

[21] Appl. No.: 723,464

[22] Filed: Sep. 15, 1976

[51] Int. Cl.² .............................................. H02J 7/00
[52] U.S. Cl. ......................................... 307/81; 320/15
[58] Field of Search ..................... 307/48, 43, 81, 80, 307/269; 200/36; 320/19, 15; 335/177, 189

[56] References Cited

U.S. PATENT DOCUMENTS

| 688,009 | 12/1901 | Siegel et al. | 307/81 |
| 2,836,734 | 5/1958 | Cichanowicz | 307/81 |
| 3,845,835 | 11/1974 | Petit | 320/61 |

Primary Examiner—Robert K. Schaefer
Assistant Examiner—Morris Ginsburg
Attorney, Agent, or Firm—Criddle, Thorpe & Western

[57] ABSTRACT

A power supply system includes a plurality of batteries or banks of batteries for supplying direct current to a load, a plurality of switching devices each coupling a different one of the batteries to the load and each responsive to an energizing signal for conducting current from the respective battery to the load, and control apparatus for successively energizing each of the switching devices one at a time so that each battery provides current to the load only for a short period of time after which another battery supplies the current, etc. The time during which each switching device is energized is selected to maximize the life of the batteries.

3 Claims, 2 Drawing Figures

ELECTRICAL POWER SUPPLY

BACKGROUND OF THE INVENTION

This invention relates to an electrical power supply system utilizing two or more batteries and switching apparatus for successively switching a load from one battery to another.

There has been considerable interest in developing alternatives to gasoline powered vehicles for reasons both of reducing air pollution and of concern for the dwindling sources of oil. Some had thought that electrical power might be developed into an attractive alternative to the gasoline engine but thus far the lack of suitably long-lived batteries has inhibited progress in this direction. Of course, any progress in improving electrical power supplies would be beneficial in a variety of situations besides that of powering vehicles.

SUMMARY OF THE INVENTION

It is an object of the invention to provide a highly efficient electrical power supply utilizing two or more batteries or banks of batteries.

It is a further object of the invention to provide a system in which current is alternately drawn from one battery and then another for application to a load.

It is still another object of the invention to provide a system for successively switching a load between a plurality of direct current sources to maximize the overall life of the sources.

The above and other objects of the present invention are realized in an illustrative embodiment of an electrical power supply which includes at least two batteries for supplying direct current, an output line for connecting to a load, and switching apparatus for automatically switching the output line between the two batteries. That is, the output line is coupled to one battery for a predetermined period of time, then to the other battery for the predetermined period of time, and then back to the first battery, etc. By switching between batteries in this fashion, it has been found that the life of the batteries can be extended for a period of time considerably in excess of the normal life.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

Figure 1:
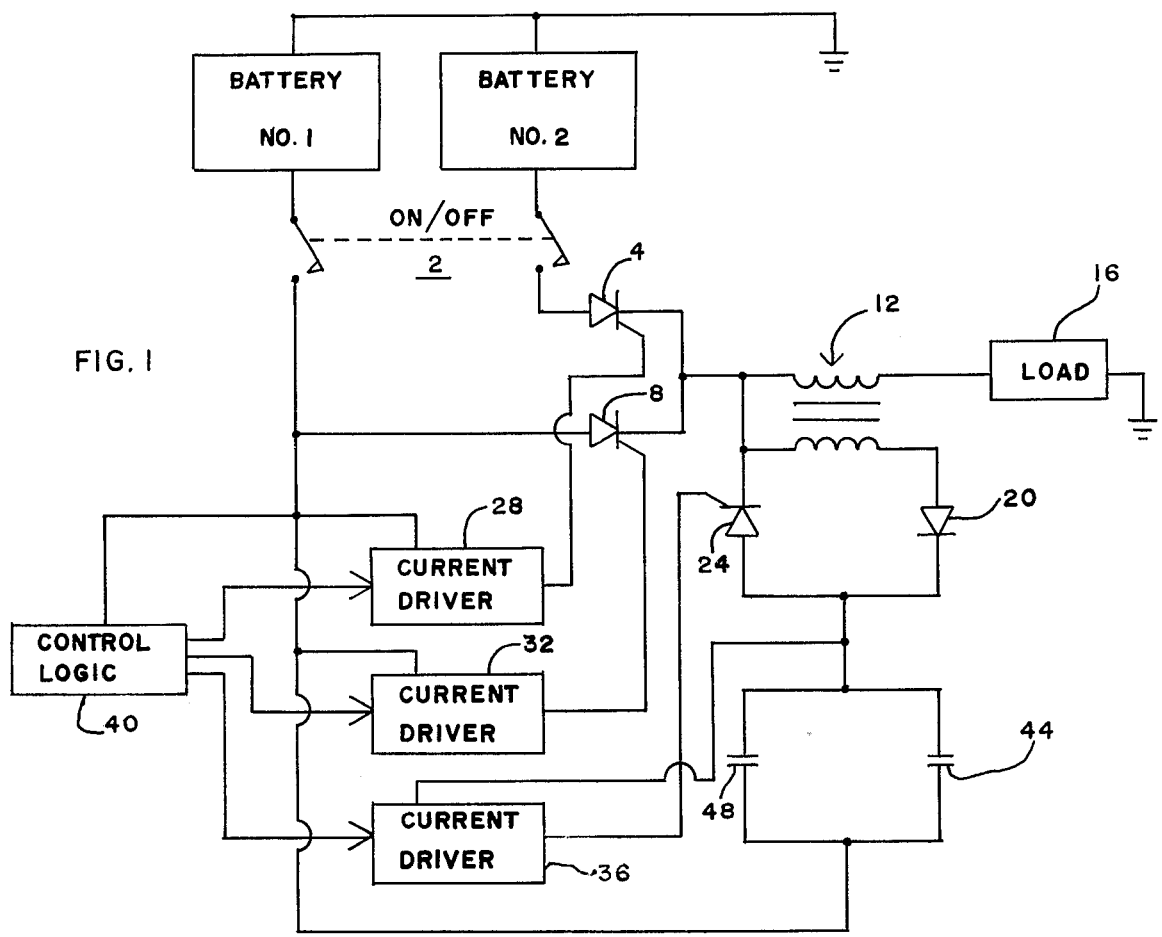
FIG. 1 shows a circuit schematic of an electrical power supply system made in accordance with the principles of the present invention.

Shown in FIG. 1 is one illustrative embodiment of the present invention. This embodiment shows two batteries, labeled battery No. 1 and battery No. 2. Each of the batteries is coupled by way of a ganged on/off switch 2 to the anode of a different one of silicon controlled rectifiers (SCR) 4 and 8. The cathodes of the SCRs are coupled to one end of both the primary and secondary winding of a transformer 12. The other end of the primary winding of the transformer 12 is coupled to a load 16. The other end of the secondary winding of the transformer 12 is coupled via a diode 20 to the anode of a third SCR 24. The gate electrodes of each of the SCRs are coupled to corresponding current drivers 28, 32 and 36. These current drivers operate under control of a control logic unit 40 to supply a current to the respective SCRs to thereby energize the SCRs to conduct current. Battery No. 1 supplies power to the control logic unit 40 and the current drivers 28 and 32.

Coupled in parallel to the junction between the diode 20 and the anode of the SCR 24 are capacitors 44 and 48.

The circuit shown in FIG. 1 is adapted to automatically and alternately couple battery No. 1 and battery No. 2 via the transformer 12 to the load 16. In other words, the circuitry alternately switches the load between battery No. 1 and battery No. 2 so that each battery supplies current only for a short period of time before the other battery is connected to the load to supply the current. By successively alternating between the batteries in this fashion, it has been found that the batteries will have a considerably longer life than if the batteries were connected so as to supply current at the same time or connected so that one of the batteries would supply all of the current until it was discharged and then the other battery would supply current. The optimum switching time (time during which any one battery is connected to the load) can be determined experimentally for any particular kind of battery, and it has been determined that for most batteries, it is advantageous to select batteries having an ampere/hour rating of about X/ 0.1 or greater, where X is the load current in amperes. It has also been found advantageous for batteries to have a switching time of generally between two and six seconds.

In operation, the control logic unit 40 of the circuit shown in the drawing alternately supplies energizing pulses to current driver 28 and current driver 32. The control logic unit 40 may simply be a standard clock circuit. When an energizing pulse is supplied to current driver 28, the current driver in turn supplies energizing current to the SCR 4 causing the SCR to conduct current from battery No. 2 via the transformer 12 to the load 16. With current flowing via the primary winding of the transformer 12 to the load 16, a lower current, but higher voltage is produced in the secondary winding of the transformer to charge the capacitors 44 and 48. After a predetermined period of time, the control logic unit 40 supplies an energizing pulse to current driver 36 which then supplies energizing current to SCR 24. With SCR 24 in a conducting state, the voltage across the capacitors 44 and 48, which is higher than the voltage level of the batteries, is applied to the junction of the cathodes of SCRs 4 and 8 so that SCR 4 ceases to conduct. Just after this, control logic unit 40 supplies an energizing pulse to current driver 32 which in turn supplies energizing current to the SCR 8 causing that SCR to conduct current from battery No. 1 via the transformer 12 to the load 16. The capacitors 44 and 48 are again charged to a voltage level above that of the batteries in preparation for the control logic unit 40 again supplying an energizing pulse to the current driver 36 to initiate turnoff of the SCR 8. After this occurs, SCR 4 is again energized to conduct. This process continues with current being supplied to the load 16 alternately by battery No. 1, and then battery No. 2, etc.

Figure 2:
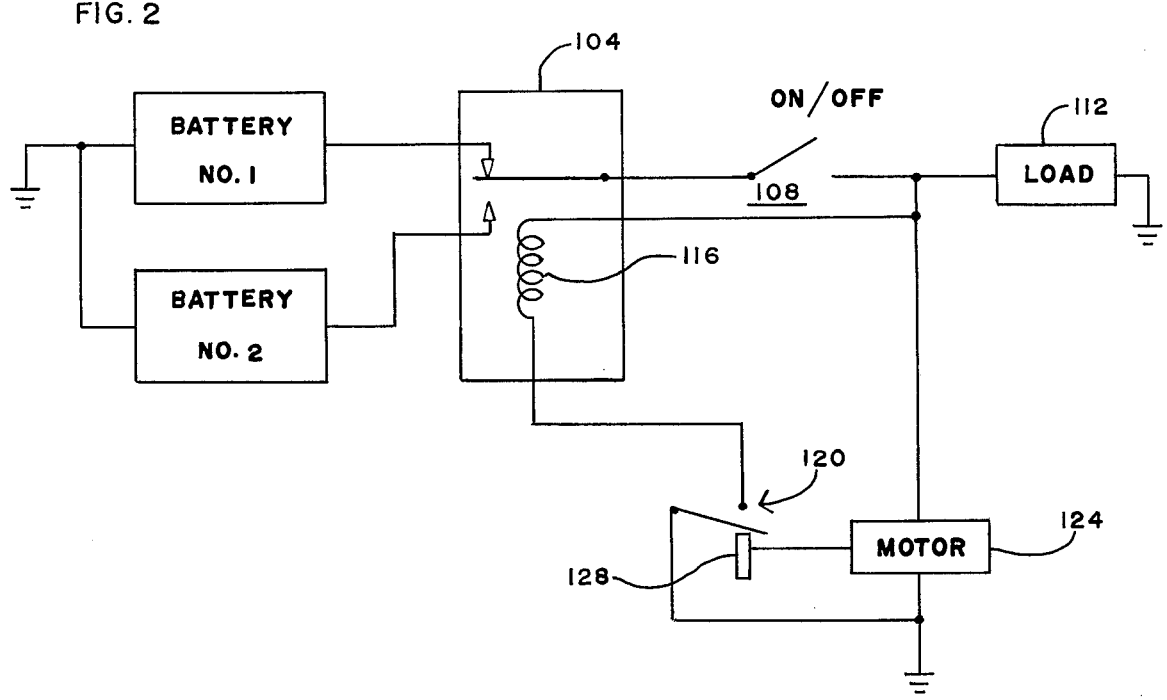
FIG. 2 shows a relay operated electrical power supply system made in accordance with the present invention.

An alternative embodiment of the invention is shown in FIG. 2. There, a pair of batteries are coupled to a relay 104 which, in turn, is coupled by way of an on/off switch 108 to a load 112. One end of a coil 116 of the relay 104 is coupled between the switch 108 and load 112, and the other end of the coil is coupled to a cam operated switch 120. A motor 124 is coupled between the switch 108 and the load 112 and positioned to rotate a cam wheel 128 so that the wheel alternately opens and closes the switch 120.

When the on/off switch 108 is closed initially, battery No. 1 supplies power via the relay 104 and on/off switch to the load 112. Power is also supplied to the motor 124 so that the cam wheel 128 is caused to rotate. If the cam wheel 128 is at a position to close the switch 120, current is supplied to the coil 116 to energize the relay 104 and cause it to disconnect battery No. 1 and connect battery No. 2 to the load. If the cam wheel 128 is at a position to open switch 120, the relay 104 maintains the connection with battery No. 1. As the motor 124 rotates the cam wheel 128, the switch 120 is caused to alternately open and close to thereby alternately connect batteries No. 1 and No. 2 to the load 112.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. For example, any number of direct current sources greater than one could be utilized with the switching circuitry to provide current to a load. Also, banks of batteries could be provided as the individual direct current sources.

What is claimed is:

1. In a power supply having a plurality of batteries for supplying direct current to a load, the respective batteries and load being coupled by switching means for alternately opening and closing the respective circuits between the load and each of the batteries to cause intermittent current flow between each of said batteries and said load serially, the improvement comprising a method for maximizing system efficiency including the steps of:
    (a) determining the load current for operation of said load,
    (b) selecting and providing batteries having an ampere/hour rating of at least ten times the value of the load current, and
    (c) adjusting the switching means to alternately open and close the respective circuits at time intervals such that the closed circuit time duration for each of the circuits is between 2-6 seconds.

2. An improvement as defined in claim 1, further comprising the steps of selectively varying the closed circuit time duration between the range of 2-6 seconds while concurrently monitoring system efficiency for identifying optimum time duration value.

3. An improvement as defined in claim 1, wherein the closed circuit time duration is approximately three seconds.

* * * * *